United States Patent [19]

Wada

[11] Patent Number: 4,655,914
[45] Date of Patent: Apr. 7, 1987

[54] METHOD AND APPARATUS FOR FILTERING IMPURITIES OUT OF FLUID

[75] Inventor: Yoneji Wada, Tokyo, Japan

[73] Assignee: Origin Company Limited, Gifu, Japan

[21] Appl. No.: 674,768

[22] Filed: Nov. 26, 1984

[30] Foreign Application Priority Data

Nov. 2, 1984 [JP] Japan .................. 59-231938

[51] Int. Cl.⁴ .............................. B01D 35/02
[52] U.S. Cl. .................. 210/168; 210/416.5; 210/434; 210/444
[58] Field of Search ................ 210/168, 323.1, 416.5, 210/434, 444, 790, 799

[56] References Cited

U.S. PATENT DOCUMENTS

| 434,571 | 8/1890 | Sargent | 210/434 X |
|---|---|---|---|
| 1,656,200 | 1/1928 | Horning | 210/434 X |
| 2,407,109 | 9/1946 | Tait | 210/434 X |
| 2,734,523 | 2/1956 | Wiggans | 210/434 X |
| 2,748,949 | 6/1956 | James | 210/434 X |
| 2,842,152 | 7/1958 | Winter et al. | 210/434 X |
| 2,979,160 | 4/1961 | Haas | 210/168 X |
| 3,358,836 | 12/1967 | Schmitt | 210/168 X |
| 3,771,624 | 11/1973 | Forgeron | 210/434 X |
| 3,933,638 | 1/1976 | Isley | 210/168 |
| 3,975,273 | 8/1976 | Shaltz et al. | 210/790 |
| 4,496,460 | 1/1985 | Haarstad et al. | 210/168 X |
| 4,512,299 | 4/1985 | Egan et al. | 210/168 X |

FOREIGN PATENT DOCUMENTS 710377 9/1941 Fed. Rep. of Germany ...... 210/434

Primary Examiner—Robert Spitzer
Attorney, Agent, or Firm—James W. Hellwege

[57] ABSTRACT

A filtering apparatus for removing impurities out of a lubrication oil for use in an internal combustion engine including low and high density filters having inlets commonly connected to an inlet conduit through which the lubrication oil to be filtered is supplied, an orifice arranged in an outlet conduit of the low density filter to produce a reduced pressure due to a fast oil flow and a conduit connected between an outlet of the high density filter and the orifice. Due to the reduced pressure applied to the outlet of the high density filter, a part of the oil is effectively sucked into the high density filter.

10 Claims, 8 Drawing Figures

METHOD AND APPARATUS FOR FILTERING IMPURITIES OUT OF FLUID

BACKGROUND OF THE INVENTION

The present invention relates generally to a method and an apparatus for filtering impurities out of a fluid, and more particularly to a method and an apparatus for filtering impurities out of lubrication oil for use in an internal combustion engine.

In various kinds of apparatuses utilizing an oil pressure and lubrication oil, various kinds of fine particulate impurities such as metal powders and carbon particles are inherently mixed in the oil. If such impurities are not removed, there might occur various drawbacks such as defect of apparatuses, leakage of oil and increase in temperature. Therefore, the duration of the oil is shortened and the oil has to be exchanged by new one frequently. In order to avoid such drawbacks, there have been proposed various kinds of filtering systems.

In the most usual filtering systems, there is provided a filtering circulation system separately from a main circulation system and a filter having a filtering element of relatively high density is arranged in the filtering circulation system. Then, the oil is forcedly flowed by a pump through the filter to remove impurities contained in the oil. This known oil cleaning system requires the pump and thus there might occur another problem that the energy loss is large.

It is also known that a part of the pressed oil is by-passed from the main circulation system through a valve for regulating the oil flow rate and is forced to pass through the filter of high density, and then the filtered oil is returned into an oil tank. In such an oil cleaning system, since a part of the oil has to be by-passed from the main circulation system, an amount of the oil must be increased than necessity. Therefore, this known oil cleaning system is not economical.

It has been generally known to insert the filter in the main circulation system. In such a system, since the filter provides a very high resistance against the flow of the oil, a very high pressure is generated in the system and thus a pipe line and filter must have a high mechanical strength. Therefore, in usual systems the filters of low density have to be used. Then, it is impossible to remove fine impurities effectively. In generaly, such fine particles affect the system to the greatest extent.

In order to avoid the above mentioned drawbacks, it has been further known to provide a filter having a large area so as to decrease an apparent resistance of the filter or to provide a fine filter in a by-path circuit. However, it is necessary to flow the oil forcedly through the by-path circuit, because the by-path circuit has a great resistance. Therefore, also in this known system, a pump has to be arranged to flow the oil through the by-path circuit and thus the energy loss occurs.

In general, in an internal combustion engine there has been widely used a lubricating system shown in FIG. 1. A lubrication oil contained in an oil tank 2 is flowed by a pump 1 into an engine 3 to be lubricated and then is returned into the oil tank 2. In an oil circulating path is arranged a filtering system. Usually, the filtering system comprises a sub-filter 4 called a strainer and a main filter 5 provided on sucking and discharging sides of the pump 1, respectively. In an automobile, the main filter 5 is formed as a cartridge and is detachably secured to an engine block 11 as illustrated in FIG. 2. These filters 4 and 5 are provided in a path through which the lubricating oil is supplied to the engine 3. In order to protect the lubricating system from the blockage and abnormal pressure increase due to increase in viscosity of the oil at a low temperature, the main filter 5 comprises a low density filtering material 12 such as a porous filtering paper. This is to say, the main filter 5 is a coarse filter which could not remove fine particles effectively.

In the known system shown in FIG. 1, there is further provided a relief valve 6 in parallel with the main filter 5. When the main filter 5 is blocked, the oil is automatically flowed through the valve 6 into the engine 3. Then the oil containing fine impurities which could not be removed by the strainer 4 is introduced into the engine 3. Therefore, it is recommended that the lubrication oil used in the automobile engine should be exchanged by a new oil every 5,000 km running. If the contaminated oil is further used, there might occur serious problems that the impurities might be introduced into slidable portions and bearings to cause the friction, and the fine particles might be deposited inside fine conduits of the oil circulation system to prevent the smooth flow of the oil and to cause the lack of lubrication. In FIGS. 1 and 2, reference numerals 9 and 10 denote a pressure adjusting valve and a pressure gauge or a pressure alarm, and reference numerals 8a and 8b are inlet and outlet conduits of the main filter 5.

In the internal combustion engine installed in automobile there is sometimes provided a turbo charger driven by an exhausted gas turbine in view of saving the resources and energy. Further, diesel engines using a light oil as a fuel are also used in some automobiles. In the turbo charger, the turbine is rotated at a high speed such as 10,000 rpm by means of exhausted gas of high temperature, and thus it is required to supply into bearings of the turbine the lubricating oil as clean as possible. In the diesel engine, the light oil generates a log of carbon particles which are liable to be mixed in the lubrication oil. Further, when sulphurous components in the light oil are burnt, sulphurous acid gas is produced. When the sulphurous acid gas is combined with a water contained in the exhausted gas, there is produced sulfuric anhydride having a strong etching action. When the sulfuric anhydride is mixed with the lubrication oil, metal portions, particularly bearing alloy portions are seriously attacked.

As illustrated in FIG. 1, in order to remove various kinds of inpurities out of the lubrication oil, it is also known to provide an auxiliary path including a high density filter 7 from the downstream of the pump 1 to the oil tank 2. By providing such an auxiliary filtering path, the lubrication oil can be cleaned effectively and can be used for a much longer time. However, such a system could be applied only to large internal combustion engines, That is to say, when the system including the axuiliary filter 7 is applied to the existent small engines, one encounters the following difficulties.

(1) Machinery work for dividing a part of the lubrication oil from the inlet conduit 8a of the main filter 5 to the auxiliary filter 7 is difficult.

(2) Machinery work for returning the oil cleaned by the auxiliary filter 7 is additionally required.

(3) Since the auxiliary filtering path including the auxiliary filter 7 undertakes a part of the oil, when the resistance of the main filter 5 is increased, an amount of the oil supplied to the engine 3 becomes small and thus there occurs a danger of lack of lubrication.

Owing to the above difficulties, the auxiliary filter 7 has not been widely adopted in the small internal combustion engines for automobiles.

The inventor has found that even if the lubrication oil has been contaminated with the fine particles, the lubrication property of the oil has not been lost. Therefore, if it is possible to remove the fine particles, the oil could still be used. Nowadays, due to the improvement of the refining technique and the development of high molecular additives and synthetic lubrication oil, the oil is scarcely degraded due to the high temperature and the usable life time of the oil has been prolonged. Under the above circumstance, it is quite advantageous to remove the fine impurities from the oil effectively.

SUMMARY OF THE INVENTION

The present invention has for its object to provide a novel and useful filtering method and an apparatus which can avoid the various drawbacks of the known filtering sytem and which can remove fine particles contained in a fluid effectively.

It is another object of the invention to provide a filtering apparatus which can be advantageously used for removing impurities contained in a lubrication oil for use in an internal combustion engine.

It is still another object of the invention to provide a filtering apparatus which can be detachably secured to an engine block just like the known filtering appratus and thus can be applied to existent engines.

According to the invention, a method of filtering impurities out of a fluid by means of a low density filter and a high density filter, inlet sides of these low and high density filters being commonly connected to an inlet conduit into which the fluid is supplied, comprises flowing the fluid which has been passed through the low density filter, at a higher speed to generate a reduced pressure;

applying said reduced pressure to an outlet side of the high density filter to generate a pressure difference across the high density filter; and sucking a part of the fluid supplied into the inlet conduit, into the high density filter with the aid of said pressure difference.

Further, according to the invention an apapratus for filtering impurities out of a fluid comprises an inlet means into which the fluid to be filtered is supplied;

a low density filter having an inlet coupled with the inlet means and an outlet;

a means coupled with the outlet of the low density filter for generating a reduced pressure due to a high speed fluid flow;

a high density filter having an inlet coupled with said inlet means, and an outlet; and a conduit means for coupling the outlet of the high density filter with said reduced pressure generating means so as to apply the reduced pressure to the outlet of the high density filter; whereby a part of the fluid supplied into the inlet means is sucked into the high density filter.

DESCRIPTION OF THE PREFERRED EMBODIMENTS

Figure 3:
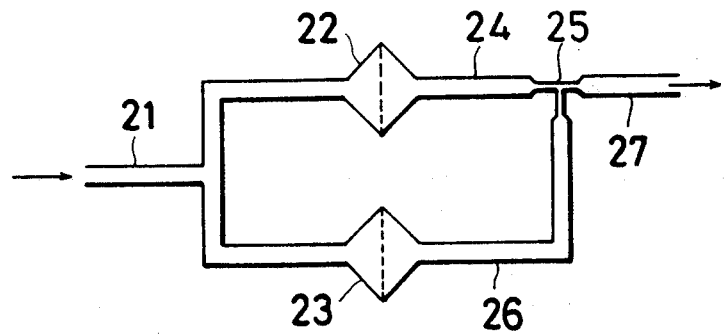
FIG. 3 is a schematic view showing a principal construction of the filtering method according to the invention.

FIG. 3 is a schematic view showing a principle construction of the filtering method according to the invention. In FIG. 3 a reference numeral 21 denotes an inlet conduit to which two filtering members having different densities 22 and 23 are coupled in parallel with each other. The filtering member 22 includes a low density filtering element for removing impurities of relatively large size, and the filtering member 22 contains a high density filtering element for removing impurities of relatively small size. Since the pressure loss in the low density filtering member 22 is smaller than that in the high density filtering member 23 and the low density filtering member 22 has a lower resistance against a fluid flow, almost all of a fluid flowing in the conduit 21 as shown by an arrow flows through the low density filtering member 22, but is not flowed through the high density filtering member 23. Therefore, fine impurities could not be removed effectively.

According to the invention, in an outlet conduit 24 there is arranged a member 25 for decreasing abruptly an inner diameter of the conduit 24. Such a member 25 may be formed by, for instance, a Venturi tube. When the fluid flows through the Venturi tube 25 having a smaller diameter, a flow speed is made high and thus its pressure becomes low. That is to say, when it is assumed that a velocity of fluid flow is v, a pressure p, a density of the fluid w, and the acceleration of gravity is g. Then, the following equation can be obtained in accordance with the Bernoulli's principle.

$$p/w + v^2/(2g) = \text{constant}$$

By providing the means for decreasing a cross sectional area of the conduit abruptly, the velocity v of the fluid flow is increased and thus the pressure p is decreased accordingly. According to the invention, an outlet conduit 26 of the high density filtering member 23 is connected to the Venturi tube 25. Then, a pressure inside the outlet conduit 26 becomes lower than that inside the inlet conduit 21. That is to say, there is produced a great pressure difference between inlet and outlet sides of the high density filtering member 23. Therefore, the fluid is drawn into the high density filtering member 23. In this manner, according to the invention large impurities contained in the fluid are removed by the low density filtering member 22 and at the same time small impurities are filtered out of the fluid by means of the high density filtering member 23. In this case, although an amount of the fluid passing through the high density filtering member 23 is relatively large, the fluid flowed through the filtering member 23 is combined in an outlet conduit 27 of a whole system with the fluid flowed through the low density filtering member 22 and therefore a total amount of the fluid is not changed.

According to the invention, the means for generating the reduced pressure due to the increase in the flow velocity may be constructed in various forms such as the Venturi tube and an orifice.

Figure 4:
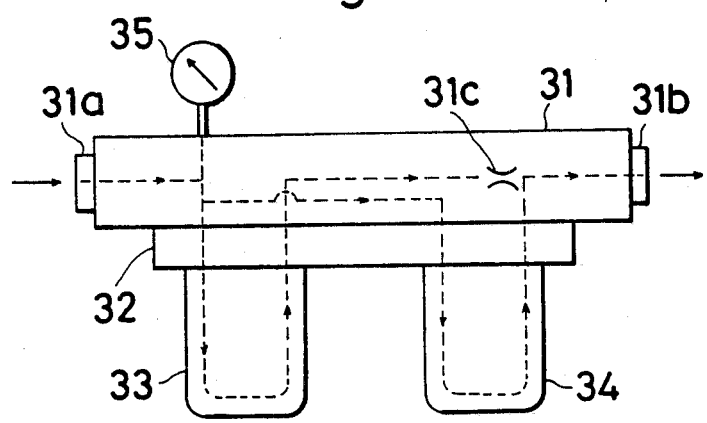
FIG. 4 is a schematic view depicting an embodiment of the filtering apparatus according to the invention.

FIG. 4 illustrates an embodiment of the filtering apparatus according to the invention which is particularly suitable for use in an internal combustion engine. FIG. 4 shows an outer appearance of the filtering apparatus which generally comprises a manifold 31 having inlet and outlet 31a and 31b and an orifice 31c, a coupling plate 32 and low and high density filters 33 and 34 formed as cartridges which are detachably secured to the coupling plate 32 side by side. As illustrated by broken lines, the inlet 31a is commonly connected to inlets of the filters 33 and 34 and an outlet of the low density filter 33 is connected to an inlet side of the orifice 31c. An outlet of the high density filter 34 is coupled with an outlet side of the orifice 31c. Further, the inlet 31a of the manifold 31 is connected to a pressure gauge 35. In the present embodiment, when a fluid supplied into the inlet 31a is flowed through the low density filter 33 and the orifice 31c, there is produced a decreased or reduced pressure at the outlet side of the orifice 31c and thus a part of the supplied fluid is drawn into the high density filter 34 effectively. Therefore, not only impurities of large size, but also those of small size can be efficiently removed by the low and high density filters 33 and 34.

Figure 1:
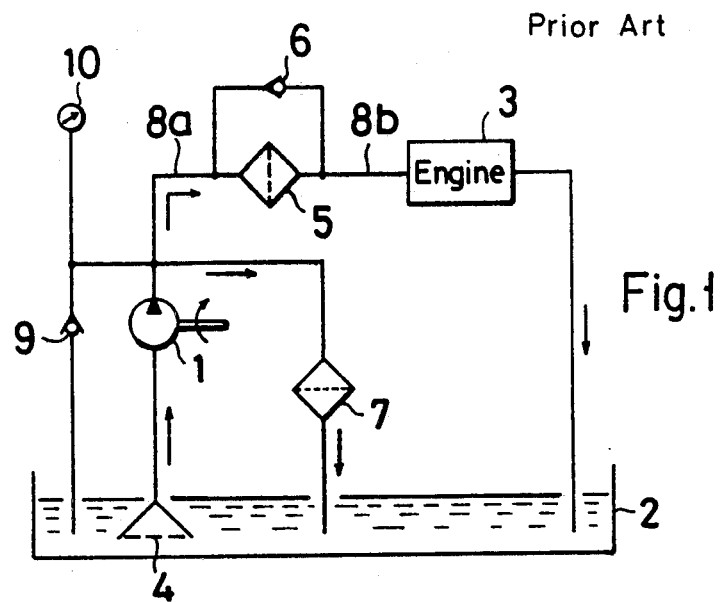
FIG. 1 is a schematic view showing a known filtering apparatus.
Figure 2:
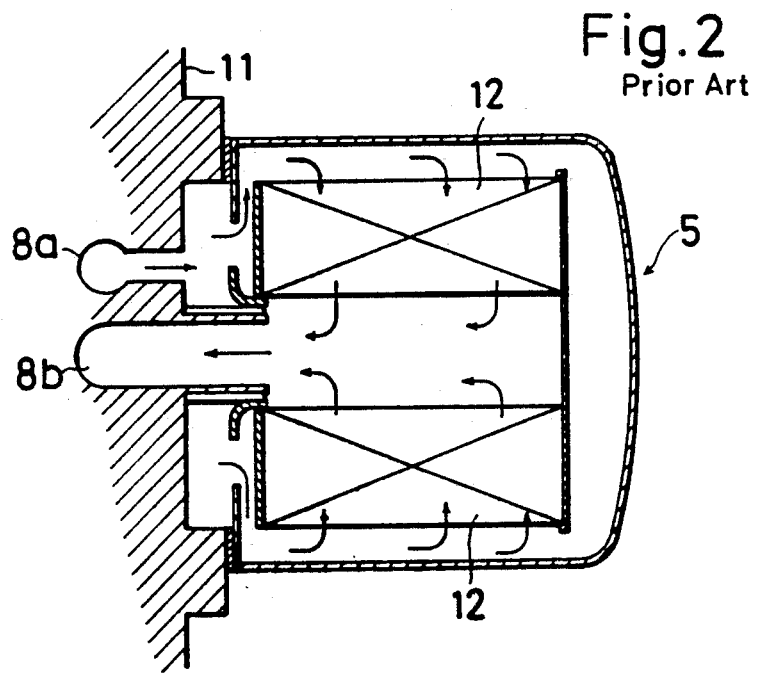
FIG. 2 is a cross sectional view illustrating a known low density filter for use in an internal combustion engine.
Figure 5:
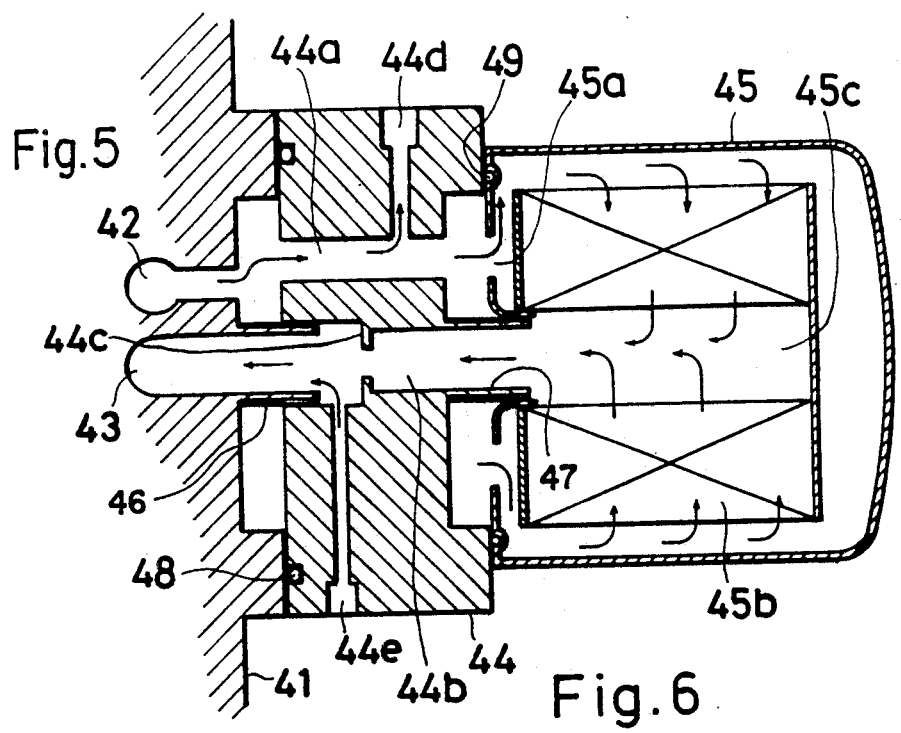
FIG. 5 is a cross sectional view illustrating another embodiment of the filtering apparatus according to the invention.
Figure 6:
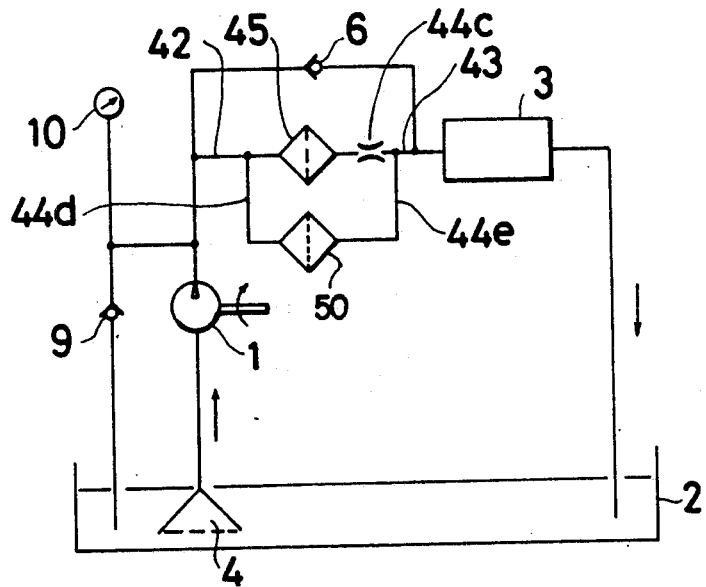
FIG. 6 is a schematic view showing a lubrication system using the filtering apparatus according to the invention.

FIGS. 5 and 6 show another embodiment of the filtering apparatus according to the invention. In the present embodiment, the filtering apparatus can be advantageously secured to an existent internal combustion engine. As shown in FIG. 5, to an engine block 41 having an inlet conduit 42 and an outlet conduit 43 formed therein is first detachably connected a manifold block 44 to which a low density filter 45 in the form of a cartridge is detachably connected. To this end, between the engine block 41 and manifold block 44, and the manifold block 44 and the filter 45, there are formed screw-thread couplings 46 and 47, respectively and packings 48 and 49, respectively. In the manifold block 44, there are formed a main inlet conduit 44a, a main outlet conduit 44b an orifice 44c provided in the main outlet conduit 44b, a sub outlet conduit 44d communicated with the main inlet conduit 44a, and a sub inlet conduit 44e communicated with the main outlet conduit 44b at a downstream position with respect to the orifice 44c. The main inlet conduit 44a is connected on one hand to the inlet conduit 42 formed in the engine block 41 and on the other hand to an inlet opening 45a of the filter 45. The filter 45 includes a filtering element 45b made of a rough filtering material such as a porous paper. A lubrication oil passed through the filtering element 45b is collected in a central conduit 45c which is connected to the outlet conduit 44b of the manifold block 44. Then a pressure in the outlet conduit 44b at the downstream position with respect to the orifice 44c is decreased. Between the sub outlet conduit 44d and sub inlet conduit 44e is inserted a high density filter 50 ( see FIG. 6 ). Therefore, a part of the lubrication oil supplied from the inlet conduit 42 of the engine block 41 is drawn into the high density filter 50 through the sub outlet conduit 44d of the manifold block 44 and the oil passed through the filter 50 is mixed via the sub input conduit 44e with the oil flowing through the main outlet conduit 44b and then is supplied into the outlet conduit 43 of the engine block 41. In this manner small and large impurities contained in the lubrication oil can be removed effectively, while a total amount of the oil is not changed at all. In FIG. 6, portions similar to those of the known system shown in FIG. 1 are denoted by the same reference numerals used in FIG. 1. According to the filtering apparatus of the invention, the lubrication oil contained in an oil tank 2 is supplied by a pump 1 into the inlet conduit 42 and is further flowed through the low density filter 45 as well as through the high density filter 50. The oil cleaned by the filters 45 and 50 is further supplied to an engine 3. An oil strainer 4 is provided on an inlet side of the pump 1, and a relief valve 6 is arranged in parallel with the low density filter 45. Further a flow rate regulating valve 9 and a pressure gauge 20 are arranged.

Figure 7:
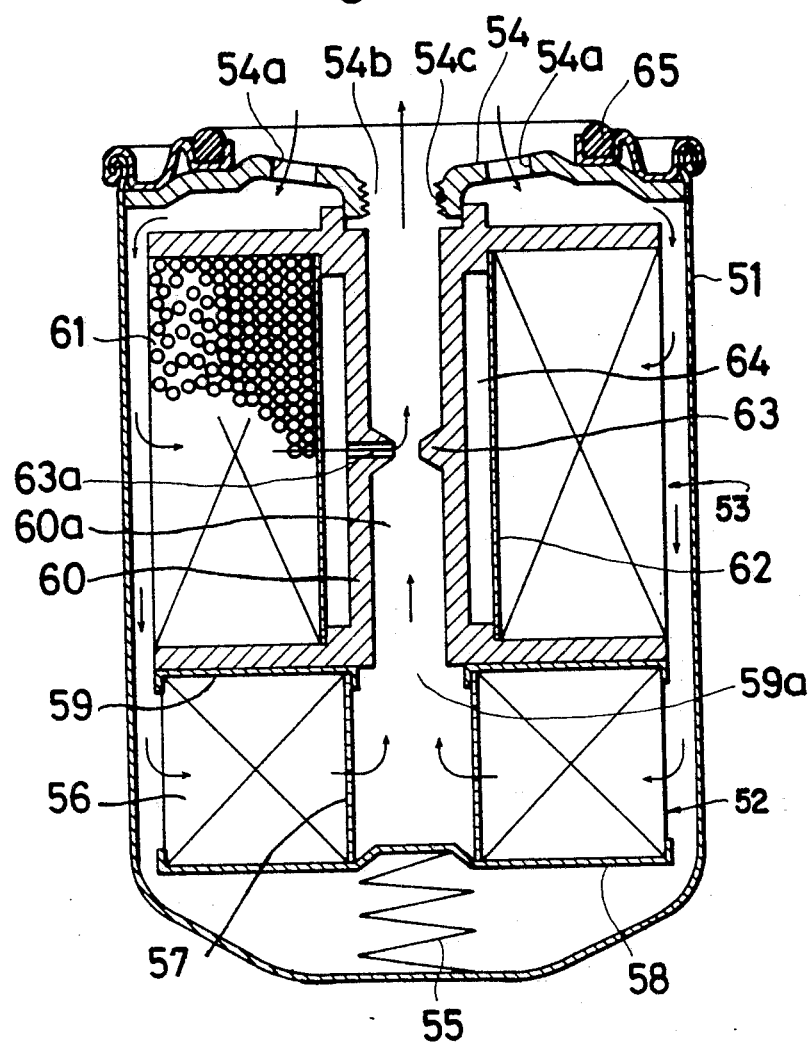
FIG. 7 is a cross sectional view illustrating still another embodiment of the filtering apparatus according to the invention.
Figure 8:
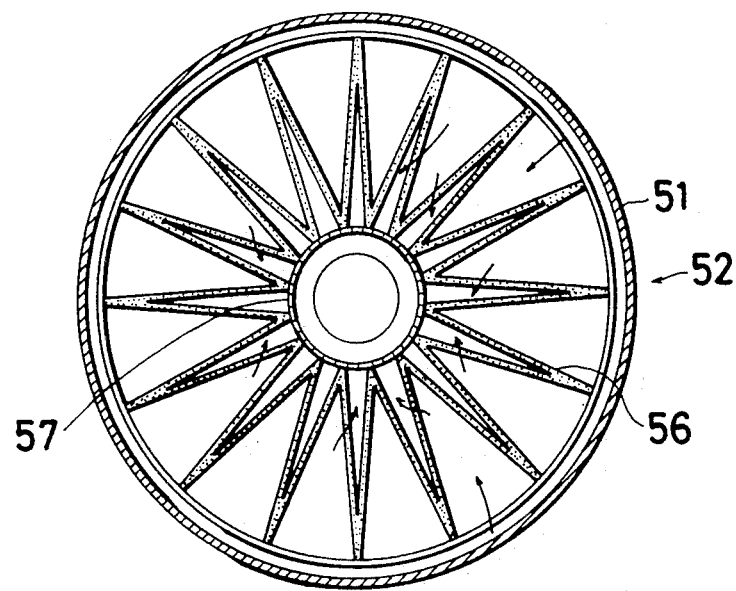
FIG. 8 is a cross sectional view cut along a line X—X in FIG. 7.

FIGS. 7 and 8 show still another embodiment of the filtering apparatus according to the invention, which can be detachably secured to a block of an internal combustion engine. The filtering apparatus comprises a housing 51 in the form of a cylindrical vessel made of metal and low and high density filters 52 and 53 installed in the housing 51. In an opening of the housing 51, there is arranged a lid member 54 having inlets 54a and a central outlet 54b on which surface is formed a thread 54c for detachably coupling the filtering apparatus with the engine block not shown. The filters 52 and 53 are supported in position by means of a coiled spring 55.

The low density filter 52 comprises a low density filtering element 56 formed by folding a paper in the shape shown in FIG. 8 about a perforated cylindrical body 57. The filtering element 56 is clamped between an outer disc 58 and an inner disc 59 having a center hole 59a. The high density filter 53 comprises a spool-like frame 60 which is made of synthetic resin. In a shaft portion fo the frame 60 is formed a central conduit 60a which is communicated with the cylindrical body 57 of the filter 52. Between outer and inner flanges of the frame 60 is arranged a coil body 61 formed by winding a twisted paper thread with a high density around a perforated cylinder 62. It is preferable that the density of the coil body 61 is increased gradually toward the inside thereof. At a middle of the central conduit 60a there is formed an orifice 63. In the orifice 63 there is further formed a passage 63a communicating the central conduit 60a with a space 64 formed between the frame 60 and cylinder 62. In order to secure the filtering apparatus to the engine block in a liquid tight manner, on an outer surface of the lid member 54 is provided a packing 65.

A lubricating oil containing impurities is introduced into the filtering apparatus through the inlet openings 54a. Then a larger part of the introduced oil is flowed into the low density filter 52 and then is flowed through the central conduit 60a. Since the orifice 63 is provided in the central conduit 60a and the oil passes through the orifice 63 at a high speed, a pressure inside the space 64 is reduced to a great extent. Therefore, a part of the oil is drawn into the high density filter 53 and the oil passed through the filter 53 is mixed with the oil passing through the central conduit 60a by means of the passage 63a. In the manner explained above, the impurities of small size are effectively removed by the high density filter 53, while the impurities of large size are captured by the low density filter 52. Further, in the present embodiment, the filtering apparatus is formed as a single unit in the form of a cartridge which can be detachably secured to the engine block, and therefore the filtering apparatus can be easily applied to the existent engine in a simple manner without additional work.

The present invention is not limited to the embodiments explained above, but many modifications and alternations can be conceived by those skilled in the art within the scope of the invention. For instance, the low and high density filters may be foremd in various manners. Further, the high density filter may be installed in the engine. Moreover, the outlet conduit of the high density filter may be connected to the Venturi tube or the orifice in various manners. For instance, the output conduit may be inclined at an angle smaller than 90° with respect to the Venturi tube or may be connected to the Venturi tube in a spiral manner. Further, the fluid may be any kind of liquid other than the lubrication oil and may be even any kind of gas.

As explained above, according to the invention the fluid is forcedly drawn into the high density filter with the aid of the decreased pressure due to the fluid flow passing through the low density filter, and thus not only large impurities contained in the fluid, but also impurities of small size can be effectively removed by the low and high density filters. Further, an amount of the fluid passing through the filtering apparatus is not decreased at all and therefore a sufficient amount of the fluid can be supplied to the utilizing apparatus such as an engine. Moreover, since the sucking force into the high density filter is generated by the fluid flow, it is not necessary to provide any additional pump. Therefore, the filtering apparatus according to the invention is particularly suitable for the internal combustion engine and the life time of the lubrication oil can be increased materially.

What is claimed is:

1. An apparatus for use in an internal combustion engine for removing impurities contained in a lubrication oil by filtration comprising
   an inlet means into which the lubrication oil to be filtered is supplied;
   a low density filter having an inlet coupled with said inlet means and an outlet;
   a high density filter having an inlet coupled with said inlet means and an outlet;
   wherein said inlet means and said low and high density filters are installed in a common housing which may be detachably secured to an engine block, said housing further including an outlet means;
   said low and high density filters comprising ring shaped filtering elements arranged one on the other along a longitudinal axis of the hosuing and including a centrally disposed conduit means which provdes communication between the outlets of the high and low density filters and the outlet of said housing,
   a flow restrictor means coupled with the outlet of the low density filter for generating a reduced pressure at the outlet side of said low density filter due to an increased speed of flow of lubrication oil which has passed from said low density filter through said flow restrictor means, said flow restrictor means positioned within said centrally disposed conduit means; and
   means for coupling the outlet of the high density filter with the outlet of the low density filter in a manner such that the reduced pressure generated by said flow restrictor means is applied to the outlet of the high density filter to draw lubrication oil supplied into the inlet means into the high density filter.

2. The apparatus of claim 1 wherein said housing comprising a cylindrical vessel.

3. The apparatus of claim 1 further comprising an annular space between a perforated tubular member defining said high density filtering element and said centrally disposed conduit means, with said means coupling the outlet of said high density filter with the outlet of said low density filter providing communication between said annular space and said centrally disposed conduit means.

4. The apparatus of claim 3 wherein said flow restrictor means comprises an orifice positioned within said centrally disposed conduit means.

5. The apparatus of claim 4 wherein said orifice comprises a portion of said centrally disposed conduit means having a reduced inner diameter through which said lubrication oil passes.

6. The apparatus of claim 5 wherein said said means coupling the outlet of said high density filter with the outlet of said low density filter comprises aperture means within said portion of said centrally disposed conduit having a reduced inner diameter which aperture means provides communication between said annular space and said centrally disposed conduit means.

7. The apparatus of claim 1 wherein said inlet means comprises an annular space formed between the housing and outer surfaces of the ring shaped filtering elements.

8. The apparatus of cliam 1 wherein said flow restrictor means comprises an orifice positioned within said centrally disposed conduit means.

9. The apparatus of cliam 8 wherein said orifice comprises a portion of said centrally disposed conduit means having a reduced inner diameter through which said lubrication oil passes.

10. The apparatus of claim 9 wherein means coupling the outlet of said high density filter with the outlet of said low density filter comprises aperture means within said portion of said centrally disposed conduit having a reduced inner diameter which aperture means provides communication between said annular space and said centrally disposed conduit means.

* * * * *